Feb. 13, 1968   J. E. WHITESELL   3,368,826
FENDER SKIRT
Filed Feb. 17, 1966   2 Sheets-Sheet 1
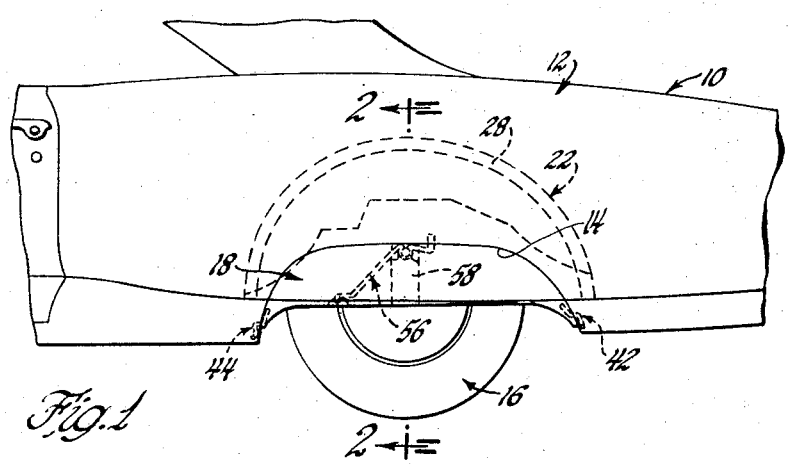
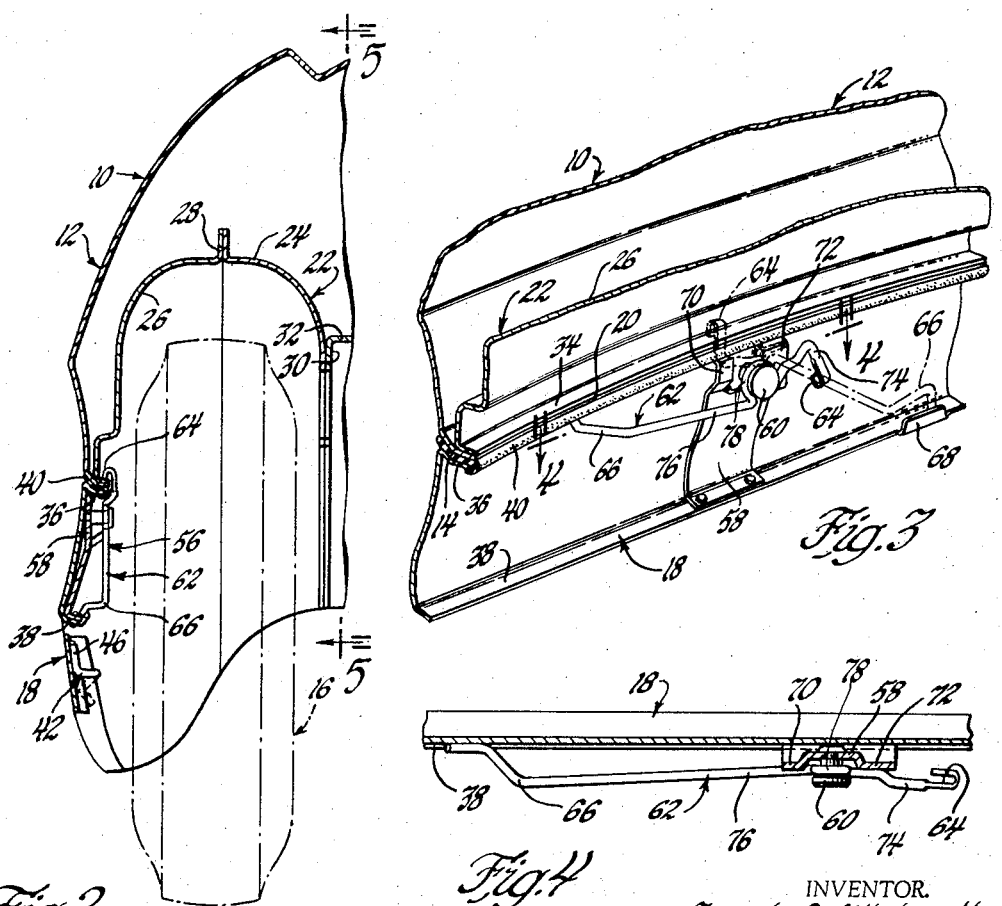
INVENTOR.
Joseph E. Whitesell
BY
Herbert Furman
ATTORNEY Feb. 13, 1968     J. E. WHITESELL     3,368,826
FENDER SKIRT
Filed Feb. 17, 1966     2 Sheets-Sheet 2
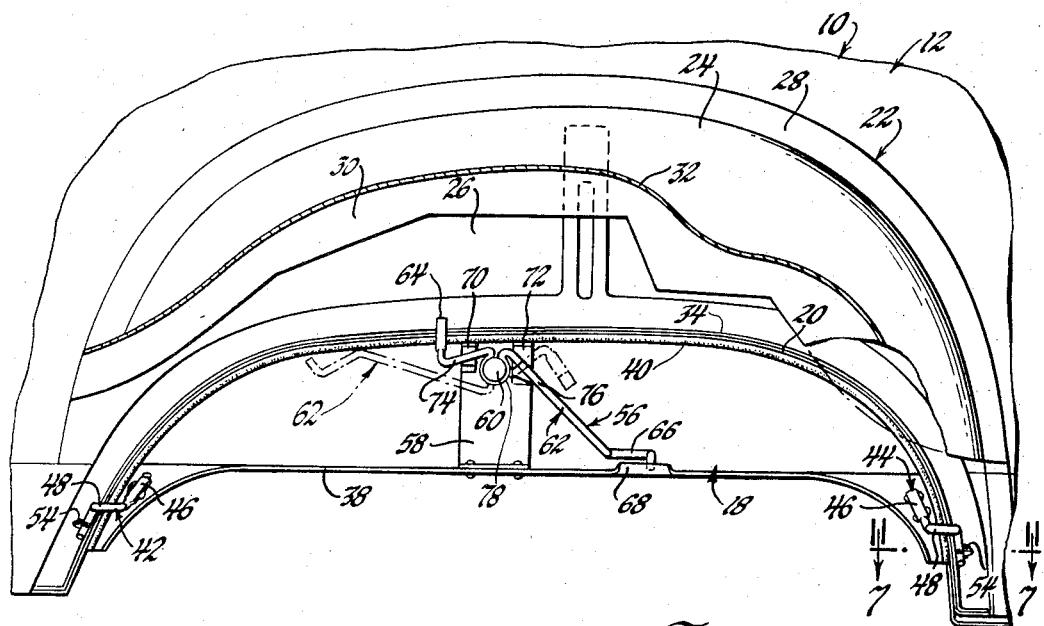
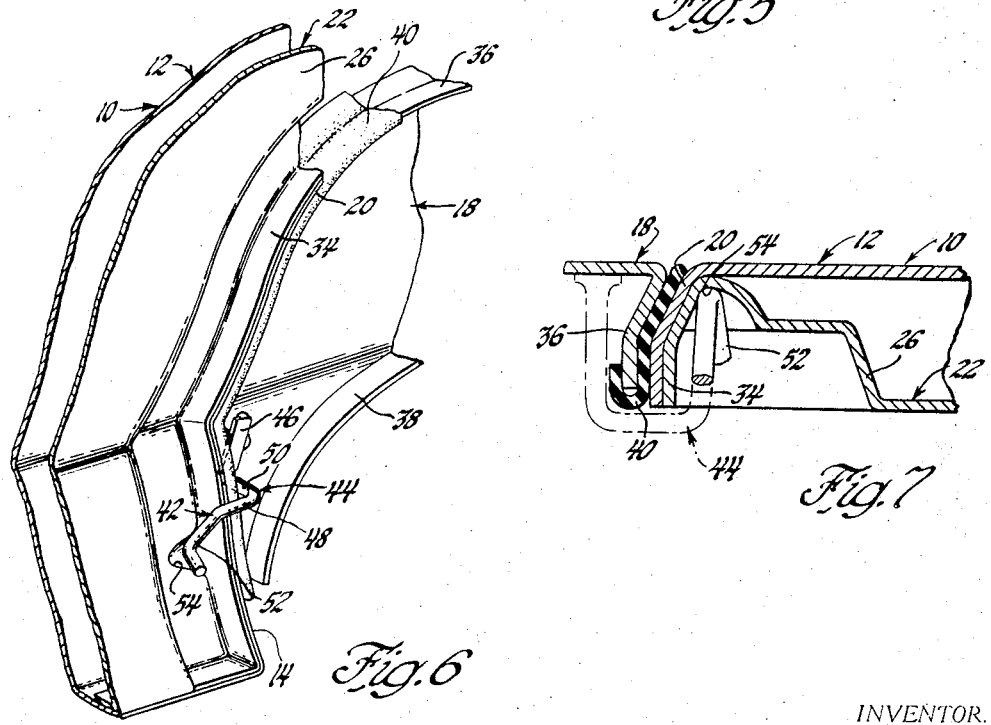
INVENTOR.
Joseph E. Whitesell
BY
Herbert Furman
ATTORNEY

United States Patent Office 3,368,826
Patented Feb. 13, 1968

3,368,826
FENDER SKIRT
Joseph E. Whitesell, Pontiac, Mich., assignor to General Motors Corporation, Detroit, Mich., a corporation of Delaware
Filed Feb. 17, 1966, Ser. No. 528,128
4 Claims. (Cl. 280—153)

ABSTRACT OF THE DISCLOSURE

A vehicle body includes a quarter panel and a wheel house structure which includes a wheel house outer member having its flange secured to the flange of the quarter panel defining the wheel opening. A fender skirt fits within the wheel opening and includes front and rear mounting brackets having return bent free arms which extend over the panel and wheel house member flanges and fit within pockets formed integrally in the wheel house outer member. A manual latch is pivoted to a bracket on the inside of the skirt and has a hook shaped end for engagement with the wheel house outer member flange. Two abutments are formed in the bracket and the latch engages both abutments in latched position. As the latch is moved to unlatched position, it moves off one of the abutments so as to be tilted about its pivot and clear the wheel house outer member flange.

---

This invention relates to fender skirts for body wheel openings and more particularly to an improved mounting means for fender skirts.

One feature of this invention is that it provides an improved mounting means for fender skirts including fender skirt mounting means and body mounting means which obviate the necessity of brackets or similar structures being secured to the body structure. Another feature of this invention is that the body mounting means may be provided on all bodies at the time the body is manufactured and yet be concealed from view from the exterior of the body. A further feature of this invention is that the body mounting means are formed integrally with the body wheel house member. Yet another feature of this invention is that the body mounting means includes a pocket formed integrally with the body wheel house member and adapted to receive the skirt mounting means. Yet a further feature of this invention is that the skirt mounting means includes a member having a return bent portion received and seated within the integral pocket on the wheel house member to locate the skirt within the wheel opening. Still another feature of this invention is that it provides an improved latch means for latching a fender skirt to a vehicle body.

These and other features of the invention will be readily apparent from the following specification and drawings wherein:

FIGURE 1 is a partial side elevational view of a vehicle body having a fender skirt mounted thereon by mounting means according to this invention;

FIGURE 2 is an enlarged sectional view taken generally along the plane indicated by line 2—2 of FIGURE 1;

FIGURE 3 is an enlarged perspective view of the latch means;

FIGURE 4 is a sectional view taken generally along the plane indicated by line 4—4 of FIGURE 3;

FIGURE 5 is a view taken generally along the plane indicated by line 5—5 of FIGURE 2;

FIGURE 6 is an enlarged perspective view of a portion of FIGURE 5; and

FIGURE 7 is an enlarged sectional view taken generally along the plane indicated by line 7—7 of FIGURE 5.

Referring now to FIGURE 1 of the drawings, a vehicle body designated generally 10 includes an outer body or rear quarter panel 12 having an opening 14 to provide access to the left rear wheel 16 of the body so that the wheel can be removed. In order to enhance the aesthetic appeal of the body 10, it is provided with a fender skirt 18 which partially closes the opening 14 and covers a portion of the wheel 16 which would normally be visible through the opening.

As shown in FIGURES 2 and 3 of the drawings, the opening 14 is defined by an inwardly extending flange 20 formed integral with the panel 12. Located inwardly of the panel 12 and of the opening 14 is a conventional body wheel house structure designated generally 22 which includes a wheel house inner member 24 and a wheel house outer member 26. The members 24 and 26 include mating flanges 28 which are secured together to provide a reinforcing pinchweld structure. As shown in FIGURES 2 and 4, the inner or lower edge of the member 24 is secured to a depending flange 30 of the body floor pan structure 32 to mount the inner portion of the wheel house structure on the body.

The outer member 26 includes a lateral inwardly extending terminal flange 34 which engages and is secured to the flange 20 of the panel 12 to mount the outer portion of the wheel house structure on the body and rigidify the wheel opening 14.

The fender skirt 18 includes an upper inwardly extending flange 36 and a lower inwardly extending flange 38 as can be seen in FIGURES 5 and 6. A conventional weatherstrip or sealing member 40 is stapled or otherwise secured to the flange 36 to provide a resilient spacer between this flange and the joined flanges 20 and 34 to prevent rattles when the skirt is mounted within the opening 14 as shown in FIGURES 3 and 5.

The skirt 18 is provided with skirt mounting means 42 adjacent each lower corner thereof. Both mounting means are the same although of different hand and, accordingly, only the forward mounting means will be particularly described. The mounting means includes a mounting member 44 having a terminal flattened portion 46 welded to the inner surface of the turned under forward lower corner of the skirt 18. This portion is joined to a forwardly or outwardly extending portion 48 by an intermediate laterally extending portion 50. The portion 48 extends across the skirt flange 36 and across the flanges 20 and 34 when the skirt is mounted in the wheel opening as shown in FIGURES 5 and 6 and includes a terminal return bent portion 52.

The body mounting means includes an outwardly extending, inwardly opening pocket 54 formed integral with the outer member 26 adjacent the flange 34 thereof as shown in FIGURES 6 and 7. The pocket 54 is of generally tapered tear drop shape and extends forwardly or away from the flange 34. The rear pocket 54 is of the same shape but extends rearwardly or away from the flange 34. When the front and rear mounting members 44 have their return bent portions 52 received and seated within the respective pockets 54, the skirt is located vertically within the opening 14, although the skirt is free to pivot outwardly of the opening. Further, the skirt can be shifted slightly forwardly or rearwardly of the body either within the opening 14 or outwardly thereof as required to align the flange 36 of the skirt with the flanges 20 and 34 of the body. In the skirt 18 as shown in the drawings, a raised lip is provided between the skirt flange 36 and the body of the skirt and the flange 34 is similarly contoured so that the skirt 18 can only move outwardly of the opening 14 but cannot move inwardly.

Once the cover is aligned within the opening 14, it is securely held in place by a latch means designated generally 56. This latch means includes a mounting bracket 58 having its upper and lower flanges secured to the flanges 36 and 38 respectively of the cover 18 generally intermediate the ends thereof. A pivot stud 60 is fixedly supported by the bracket 58 adjacent the upper end thereof and slidably and rotatably mounts a latch arm 62. The latch arm 62 includes an upper flattened, hook-shaped portion 64 which is adapted to be swung into and out of engagement with the flange 34 and is connected by an integral eye portion with a lower manual operating portion 66.

When the latch is in latched position as sown in FIGURE 5, the bent end of the operating portion 66 fits behind an upwardly extending tab 68 of flange 38 to prevent accidental release of the cover. The bracket 58 includes embossments 70 and 72 to each side of the pivot stud 60 as shown in FIGURE 3. When the latch member is in latched position, FIGURE 5, arm portions 74 and 76 thereof respectively seat on the embossments 70 and 72 to bias the latch arm 62 inwardly of the skirt 18 and seat the eye portion 78 firmly against the head of stud 60. When the latch member 62 is swung clockwise toward unlatched position, FIGURE 3, after the manual operating portion 66 thereof is moved out from behind tab 68, the arm portions 74 and 76 initially move off their respective embossments 70 and 72. Thereafter, upon continued clockwise movement of the latch member, the arm portion 74 moves onto the embossment 72 as shown in FIGURE 3, while the arm portion 76 is free of any engagement with either embossment, so that the latch member 62 is tilted relative to the stud 60 to shift the manual operating portion 66 thereof outboard of the skirt or therewithin while the hook portion 64 moves inboard of the skirt and free of any engagement with the flange 34 so that the skirt can thereafter be removed from within the opening 14 by either moving the skirt downwardly within the opening or first tilting it slightly outwardly of the opening before moving it downwardly.

It is believed that mounting of the skirt within the opening is clearly evident from the foregoing description. Briefly the skirt is moved upwardly within the opening 14, either within the plane of the opening or tilted slightly outwardly thereof until the return bent portions 52 of the members 44 seat within the pockets 54. Thereafter the skirt is moved within the opening 14, if necessary, and the latch member is swung counterclockwise about the pivot 60 until the arm portions 74 and 76 again seat on the embossments 70 and 72 and the hook portion 64 engages the flanges 34. The bent end of the portion 66 is then fitted behind the tab 68 to retain the latch member in this position against any disengagement.

Thus, this invention provides an improved fender skirt.

I claim:

1. In a vehicle body, the combination comprising, a vehicle body having a wheel opening therein, a body wheel house member mounted on said body and located inwardly of said opening for receiving and housing a vehicle wheel, at least one outwardly extending inwardly opening pocket formed integrally in said wheel house member adjacent said opening, a cover for said opening having a mounting member secured thereto, said mounting member including a portion seating within said pocket to locate and align said cover within said opening, and means releasably securing said cover to said body.

2. The combination recited in claim 1 wherein said body and said wheel housing member are provided with flanges extending inwardly of said opening and said pocket is provided in said body wheel housing member adjacent the flange thereof.

3. The combination recited in claim 2 wherein said mounting member includes a generally U-shaped portion straddling said body flange and said wheel housing member flange.

4. The combination recited in claim 1 wherein said vehicle body includes a flange defining at least a portion of said wheel opening, said releasable means includes a support member mounted on said skirt and provided with a pair of spaced abutments and pivotal support means, a latch member mounted on said pivotal support means for pivotal movement relative thereto between a latched position wherein said latch member includes a portion overlying said flange and an unlatched position relative thereto wherein said member is tilted relative to said support member to locate said portion thereof out of overlying relationship to said body flange, said latch member having portions thereof engageable with said spaced abutments upon movement there of to latched position to locate said member relative to said pivotal support means and locate said portion thereof in overlying relationship to said body flange, movement of said member toward unlatched position moving at least one portion of said member out of engagement with at least one of said abutments to permit said member to be tilted relative to said pivotal support means and move said portion thereof out of overlying relationship to said body flange.

References Cited
UNITED STATES PATENTS 2,057,322  10/1936  Balthazor _____ 280—153
2,761,698  9/1956  Schatzman _____ 280—153

BENJAMIN HERSH, *Primary Examiner.*

PHILIP GOODMAN, *Examiner.*